Patented Oct. 15, 1935

2,017,354

UNITED STATES PATENT OFFICE 2,017,354

SOLDERING FLUX

Harry V. Rees, Long Beach, and Horace Ketcheson, Wilmington, Calif., assignors to The Texas Company, New York, N. Y., a corporation of Delaware No Drawing. Application September 2, 1933, Serial No. 688,028

3 Claims. (Cl. 148—23)

This invention relates to a soldering flux.

In the uniting of two portions of the same metal or of different metals by means of a more fusible metal or metallic alloy known as solder, it is customary to employ a flux to assist in the soldering operation. The flux is generally melted and applied to the joint, and acts partly by forming a protective film to prevent direct contact of the metal surfaces with the air and thereby avoiding oxidation, and partly by reducing and dissolving any oxides which may form or be present thereon. This invention relates to a flux of this character.

An object of the invention is to provide a superior soldering flux giving exceedingly fine results for soldering operations.

Another object of the invention is to utilize a normally waste material produced in the refining of a petroleum oil as a soldering flux, to thereby afford a very economical material for this purpose, and at the same time produce a flux which is equal or superior to the fluxes normally employed.

In the refining of various mineral oil products derived by distillation and cracking operations, such as lubricating oils, lamp oil stocks, gasoline stocks, distillates derived from oil shale, etc., it is known to treat the oil in vapor phase by intimate contact with an aqueous solution of zinc chloride. This is ordinarily carried out in a contact tower, to which a concentrated solution of zinc chloride in water is supplied to substantially fill the tower. The vapors of the oil are bubbled through the aqueous solution in the tower, being finely dispersed therein by the contact or filling material present in the tower. The entire mass within the tower is maintained at a comparatively high temperature, generally above 300° F. This treatment is found to purify and refine the mineral oil, by removing unstable compounds, such as the gum forming compounds, sulphur compounds and the oxidizable compounds which cause deterioration in color. The process has been utilized on a commercial scale particularly for the treatment of gasoline to remove the above-mentioned objectionable compounds and impurities, and thereby enhance its value as a motor fuel. The treated vapors of the oil pass off from the tower to a condenser, where a purified liquid oil is recovered. The spent zinc chloride, together with contained impurities and compounds removed from the oil, is withdrawn either continuously or intermittently from the tower.

The spent material so removed is generally in the form of a somewhat pasty suspension, the consistency thereof depending upon the proportion of water remaining unvaporized in the mass. Frequently, additional water, or water vapor, is introduced into the tower to compensate for that passing off as vapor, and to prevent the spent treating agent from solidifying within the tower. This spent material, which we term "spent zinc chloride" contains a heterogeneous mixture of compounds, more or less complex, which are difficult to analyze and identify. It has been demonstrated, however, that the action of the zinc chloride solution is somewhat similar to the refining action of sulphuric acid, as causing a condensation of certain gum forming and oxidizable compounds present in the oil, to produce higher boiling point compounds or higher polymers which condense out of the oil vapors undergoing treatment. Sulphur compounds present in the oil are also reduced and partially removed, and a substantial proportion of zinc sulphide is found in the spent material. Also, a small amount of oxychlorides may be formed.

We have discovered that this spent zinc chloride resulting from the refining of a mineral oil provides an excellent soldering flux. Contrary to expectations, the ingredients and compounds removed from the mineral oil and present in the spent material, do not appear to injuriously affect its fluxing properties. Rather, they appear to impart a beneficial action in that the flux so produced has been found superior to the customary substantially pure zinc chloride fluxing agent produced by cutting metallic zinc with hydrochloric acid.

However, a still further economy in the operations may be effected by separating the spent zinc chloride, as by settling and decantation, into a purer zinc chloride layer which is suitable for reuse in the refining treatment of additional petroleum oil, and a sludge layer containing a smaller proportion of zinc chloride admixed with the reaction compounds and impurities removed from the oil. This may be accomplished by passing the spent zinc chloride to tankage where it is allowed to stand and stratify into distinct layers, comprising a top oily layer, a second zinc sludge layer, a third zinc chloride layer and a small bottom layer containing zinc oxychlorides. The oil and zinc sludge are decanted off, and then the zinc chloride layer is separated and returned to the refining system. We have further discovered that the zinc sludge so produced, even though containing a comparatively small proportion of zinc chloride and a comparatively large proportion of other compounds and impurities including oil, zinc sulphide and zinc oxychloride, provides an excellent soldering flux. The oil may be allowed to remain with the sludge while still obtaining the desired fluxing properties; but, preferably, the sludge is allowed to settle and oil skimmed off, as this material is suitable as a gas oil which may be added to cracking stock. An appreciable quantity of oil nevertheless remains in the sludge, and this material has the superior fluxing properties desired. The bottom oxychloride layer may also be added to the sludge, so that all of the material normally wasted is recovered as a soldering flux. The expression "waste sludge" as used in the description and claims is to be understood to denote the zinc sludge layer with or without separation or skimming off of the oil, and with or without admixture of the zinc oxychloride layer, unless the contrary appears from the text.

While we cannot state definitely the reason for this improved action of the waste sludge, it appears attributable to the presence of certain of the compounds and reaction products resulting from the treatment of the oil; and its superiority has been demonstrated repeatedly in the soldering of such metals as brass, copper, tin and even iron, and alloys thereof. In general, it may be stated that the flux is suitable for all the soldering operations in which the comparatively pure zinc chloride solution as normally employed is used. The waste sludge possesses in common with the spent zinc chloride certain advantages over the ordinary zinc chloride-hydrochloric acid mixture, in that one concentration or solution of the former is equally suitable for soldering galvanized iron, tin or copper, there is no disagreeable pungent odor of vaporized hydrochloric acid during the application, and they are not harmful to the hands of an operator.

As a specific example, the following is mentioned: A contact tower filled with checker brick, Raschig rings, or other suitable form of contact material, is supplied with a solution of zinc chloride of specific gravity of 1.528 (50.1 Bé.), containing 47.5% zinc chloride by weight. Gasoline vapors to be refined are bubbled up through the aqueous solution within the tower, the entire mass being maintained within a temperature range of 300–350° F. Additional water is supplied to the tower to make up for that evaporated and to keep the zinc chloride in a fluid condition. The treated vapors pass off from the top of the tower to condensing apparatus. The spent zinc chloride in the form of a suspension or pasty mass of a consistency such as to flow, is withdrawn from the base of the tower. A typical test of this material showed a specific gravity of 1.743 (61.8 Bé.) with 60.1% zinc chloride by weight. A test for sulphide sulphur disclosed 7.5% by weight.

The spent zinc chloride is passed to tankage where it separates into four distinct layers, as follows:

Top layer_____ Oil
Second layer__ Zinc sludge
Third layer___ Zinc chloride
Bottom layer_ Zinc oxychloride (practically negligible)

The top oil layer is decanted off and returned as gas oil. The zinc sludge layer is then decanted off, and the zinc chloride layer is then returned to the system for reuse in the refining process. The sludge layer is combined with the bottom oxychloride layer to provide a water suspension suitable for use as a soldering flux. A typical test of the sludge so produced showed 30% by weight of solids and 24% by weight of oil. The zinc chloride content was found to be 18% by weight. The solids are composed primarily of zinc sulphides and zinc oxychlorides in addition to the zinc chloride. The sludge may be allowed to settle, and a further quantity of oil skimmed off for return as gas oil.

If desired, the sludge may be diluted with water and the mixture filtered to remove the solids to form a dry soldering flux, which may be used in that form or made down with water at the time of use.

The flux is used in the customary manner of a zinc chloride flux. Thus the parts to be joined are freed of oxide and thoroughly cleaned, as by filing, scouring or scraping. The flux and solder are applied in the usual manner to the parts which are joined and thereby united.

Obviously many modifications and variations of the invention, as hereinbefore set forth, may be made without departing from the spirit and scope thereof, and therefore only such limitations should be imposed as are indicated in the appended claims.

We claim:
1. A soldering flux comprising a waste sludge resulting from the refining of a petroleum oil with zinc chloride.
2. A soldering flux comprising a spent zinc chloride containing compounds removed from a petroleum oil by contact of the oil in vapor phase with an aqueous zinc chloride solution.
3. A soldering flux comprising a material removed as a waste sludge from the vapor phase treatment of a petroleum oil with a concentrated aqueous solution of zinc chloride, and containing zinc chloride, zinc sulphide, zinc oxychloride, oil and water.

HARRY V. REES.
HORACE KETCHESON.